United States Patent
Meiser

[15] 3,650,821
[45] Mar. 21, 1972

[54] RAPID CURING MELAMINE-FORMALDEHYDE IMPREGNATED PAPER SHEET FOR PRODUCING SURFACE OF IMPROVED STAIN RESISTANCE AND LUSTER RETENTION

[72] Inventor: Kenneth D. Meiser, Dallas, Tex.
[73] Assignee: Plastics Manufacturing Company, Dallas, Tex.
[22] Filed: Aug. 10, 1970
[21] Appl. No.: 62,648

Related U.S. Application Data

[63] Continuation-in-part of Ser. No. 745,130, July 16, 1968, abandoned, and a continuation-in-part of Ser. No. 473,815, July 21, 1965, abandoned.

[52] U.S. Cl...........................117/155 L, 260/29.4, 260/67.6, 161/263
[51] Int. Cl. ............................................................D21h 1/40
[58] Field of Search.....................112/155 L; 260/29.4, 67.6; 161/263

[56] References Cited

UNITED STATES PATENTS

| | | | |
|---|---|---|---|
| 2,841,571 | 7/1958 | Wohnsiedler | 260/29.4 X |
| 3,084,071 | 4/1963 | Van Loo et al. | 260/29.4 X |
| 2,839,429 | 6/1958 | Marsh et al. | 260/29.4 X |

*Primary Examiner*—Murray Katz
*Assistant Examiner*—M. R. Lusignan
*Attorney*—Marshall and Yeasting

[57] ABSTRACT

An aqueous solution of a slightly hydrophobic, unmodified reaction product of formaldehyde and melamine in a molar ratio from 1:1 to 1.9:1 and, as a curing catalyst, a water-soluble acidic salt of aluminum or zinc, which solution remains ungelled for at least 12 hours at ordinary temperatures, is used to impregnate a cellulosic paper sheet. The dried sheet forms a surface lamination cures in 1 to 2 minutes at 315° F. to a surface having superior stain-resistance and luster retention.

2 Claims, No Drawings

RAPID CURING MELAMINE-FORMALDEHYDE IMPREGNATED PAPER SHEET FOR PRODUCING SURFACE OF IMPROVED STAIN RESISTANCE AND LUSTER RETENTION

CROSS-REFERENCE TO RELATED APPLICATIONS

This is a continuation-in-part of applications Ser. No. 473,815, filed July 21, 1965, and Ser. No. 745,130, filed July 16, 1968, both of which are now abandoned.

BACKGROUND OF THE INVENTION

This invention relates to a melamine-formaldehyde impregnated paper sheet which is substantially stable in storage, and which forms a surface lamination that cures rapidly to provide a surface having superior stain-resistance and luster retention. Because of these properties, the impregnated paper sheet of the present invention is particularly advantageous for use as a surface lamination in the production of molded dinnerware.

One of the most important commercial uses of melamine-formaldehyde resins is in the production of molded dinnerware. Approximately 80 percent of the dinnerware sets produced for household use from melamine-formaldehyde resins contain decorated pieces which are produced with a surface lamination of paper impregnated with a melamine-formaldehyde reaction product. Typically the sheet of paper which is to form the surface lamination is printed on its underside with a design, which is usually in several colors. In the subsequent molding operation, a molding composition is used to form the body of the plate or other article, and the impregnated paper sheet is used to form a surface lamination on one side of the article. In the molded article this surface lamination is substantially transparent, so that the printed design is very clearly visible and yet is protected because it is on the underside of the lamination.

Decorated dinnerware made by this known method has the disadvantage that the decorated surface formed by the surface lamination has less initial luster and is more subject to staining and loss of luster during use than a surface of the molded article on which no surface lamination has been used. In other words, the use of a surface lamination on such a molded article has made it possible to decorate the article with a design, but only by sacrificing the stain-resistance, initial luster and luster retention of the decorated surface. Such sacrifice in the stain-resistance, initial luster and luster retention of the decorated surface has been particularly undesirable because the decorated surface, such as the upper surface of a plate, is the surface which is usually exposed to view during the use of the article. These deficiencies have made such decorated dinnerware generally unacceptable for commercial applications such as use in restaurants or institutions. In such commercial applications, staining and loss of luster are serious problems, because each piece of dinnerware is used more frequently than in household use. For these reasons this type of decorated dinnerware, which is sold in large quantities for household use, has found very little use in restaurants.

In this known method of producing decorated dinnerware, the reaction product with which the paper surface lamination is impregnated is the product of the reaction of formaldehyde and melamine in a molar ratio between 2:1 and 2.5:1. A reaction product with this molar ratio is fast curing, even in the absence of a catalyst. In the known method, no curing catalyst is incorporated in the fast curing reaction product with which the paper surface lamination is impregnated, and in the molding of an article of dinnerware the normal molding period of 1 to 2 minutes at 315° F. is sufficient to complete the cure of the reaction product with which the paper surface lamination is impregnated.

One of the objects of the present invention is to improve the properties of the surface lamination of decorated dinnerware by using in the surface lamination a product of the reaction of formaldehyde and melamine in a molar ratio substantially less than the molar ratio between 2:1 and 2.5:1 which has been used heretofore. However, the difficulty with a reaction product in a lower molar formaldehyde-melamine ratio is that such a reaction product is much slower curing than a reaction product in which the molar ratio is between 2:1 and 2.5:1. If such a reaction product having a substantially lower molar formaldehyde-melamine ratio were used in place of the reaction product usually employed in the surface lamination of decorated dinnerware, without a curing catalyst, the cure of this slow curing reaction product would not be completed during the molding time and at the molding temperature normally used in commercial practice for the molding of decorated dinnerware.

The use of a slow curing reaction product of formaldehyde and melamine in a relatively low molar ratio is described in Example 7 of U.S. Pat. No. 2,841,571. In that example the relatively slow curing reaction product was cured at temperatures as high as 175° to 225° C. in order to complete the cure in an interval of 3 to 5 minutes. With those high temperatures, the sheets that were impregnated with the slow curing reaction product were sheets of heat resistant material such as glass cloth. Impregnated cellulosic paper surface laminations are not cured at such high temperatures, because of the danger of charring of the cellulose. The temperature used for curing molded dinnerware, having a paper surface lamination, is about 315° F., which is equal to 157° C., and the curing time at that temperature is only 1 to 2 minutes.

It is known that an acidic substance will act as a catalyst to accelerate the cure of a formaldehyde-melamine reaction product. In practice, however, it has not been possible heretofore to incorporate an acidic substance as a curing catalyst in an aqueous solution of a formaldehyde-melamine reaction product which is used in an impregnating apparatus, because it has been found in general that as soon as an acidic substance is incorporated in an aqueous solution of a formaldehyde-melamine reaction product, the reaction product immediately begins to cure to an infusible state so that it quickly gels or precipitates from the solution. An acidic substance which causes rapid precipitation or gelling cannot be incorporated in an aqueous solution used in a commercial impregnating operation, because a solution used in a commercial impregnating operation must remain stable for at least 12 hours because the solution must be held in the tanks of the impregnating apparatus during a working day, and at the end of the working day the residue of solution in the tanks must remain stable long enough to permit a clean-up crew to drain and flush out the tanks.

Although it has not been possible in commercial practice heretofore to incorporate an acidic substance in an aqueous solution of a formaldehyde-melamine reaction product which is used in an impregnating apparatus, it has been common practice to prepare a dry mixture of an acidic substance with a formaldehyde-melamine reaction product for use as a molding composition. In such a dry mixture, the reaction product and the acidic substance are present as discrete particles, so that the acidic substance has no appreciable catalytic action upon the reaction product until the molding composition is fused during the molding operation. The situation when an acidic substance is present in the form of discrete particles mixed with a dry reaction product is quite different from the situation when the acidic substance has been molecularly dispersed in the reaction product by incorporating it in an aqueous solution. Thus U.S. Pat. No. 2,841,571 discloses the incorporation of a curing catalyst only in a dry molding composition, and does not disclose the incorporation of a curing catalyst in the impregnating solution of Example 7.

U.S. Pat. No. 3,194,723 also states that melamine-formaldehyde resins have poor stability in aqueous solutions in that the resins separate therefrom upon standing for relatively short periods of time, e.g., 1–2 days. (Even in the absence of an acidic curing catalyst).

SUMMARY OF THE INVENTION

The principal object of the invention is the production of a dried paper sheet which forms a surface lamination that cures in 1 to 2 minutes at 315° F. to a surface having superior stain-resistance and luster retention. Such a paper sheet is produced by drying a cellulosic paper sheet which has been impregnated with an aqueous solution of a slightly hydrophobic, unmodified reaction product of formaldehyde and melamine in a molar ratio from 1:1 to 1.9:1 containing, as a curing catalyst, a water-soluble acidic salt of aluminum or zinc.

In accordance with the invention, it has been discovered that the solution thus used in the practice of the invention remains ungelled for at least 12 hours at ordinary temperatures, and the dried paper sheets which have been impregnated with such a solution are substantially stable so that they can be stored or shipped.

This discovery that the combination of a slightly hydrophobic, unmodified reaction product of formaldehyde and melamine in a molar ratio from 1:1 to 1.9:1 with a curing catalyst which is a water-soluble acidic salt of aluminum or zinc forms a stable aqueous solution is a surprising discovery, because the presence of an acidic substance other than a salt of aluminum or zinc would render such a reaction product unstable in an aqueous solution because it would cause the reaction product to gel or precipitate from the solution. The action of an acidic salt of aluminum or zinc in combination with a slightly hydrophobic, unmodified reaction product of formaldehyde and melamine in a molar ratio from 1:1 to 1.9:1 is very unusual, in that the aqueous solution remains ungelled for at least 12 hours at ordinary temperatures, and paper sheets which have been impregnated with aqueous solution and dried are substantially stable and yet form surface laminations that cure in 1 to 2 minutes at 315° F. That is all the more surprising in view of the disclosure of U.S. Pat. No. 3,084,071. That patent discloses that the incorporation of an acidic salt of aluminum or zinc in a water-soluble aminoplast resin with which a textile fabric is impregnated causes the aminoplast resin to cure in only 1 day, even after the impregnated fabric has been dried, so that the fabric must then be rinsed in cold water for 10 minutes to remove the aluminum or zinc salt in order to prevent overcuring. The difference in results is accounted for by the fact that the "aminoplast resin" used in accordance with the disclosure of U.S. Pat. No. 3,084,071 is a simple monomeric water-soluble reaction product, whereas the reaction product used in the practice of the present invention is a slightly hydrophobic reaction product of formaldehyde and melamine, which is a relatively complex condensation product of high molecular weight. The reaction products which are used for treating textile fabrics, as disclosed in U.S. Pat. No. 3,084,071, are simple crystalloidal substances. The use of similar crystalloidal reaction products for treating textile fabrics is disclosed in U.S. Pat. No. 2,839,429. These crystalloidal monomeric water-soluble reaction products are highly unstable in the presence of an aluminum or zinc salt in that they cure in only 1 day even in a dried textile fabric.

The combination of an acidic salt of aluminum or zinc with a slightly hydrophobic, unmodified reaction product of formaldehyde and melamine in a molar ratio from 1:1 to 1.9:1, which is used in the practice of the present invention, is highly advantageous in that it forms an aqueous solution that remains ungelled for at least 12 hours at ordinary temperatures, and in that it remains substantially stable after paper sheets have been impregnated with the aqueous solution and dried.

The stability of the dried paper sheets of the present invention is important, because impregnated paper sheets for use as surface laminations on molded dinnerware are articles of commerce which are commonly produced in an impregnating plant, then shipped to a printer who prints a suitable decoration upon the sheets, and then shipped to a molder who uses the printed impregnated sheets as surface laminations in the molding of dinnerware. A formaldehyde-melamine reaction product with which such sheets are impregnated must remain stable during storage, handling and shipment of the sheets, so that when the impregnated paper sheets are finally used in producing molded dinnerware, the reaction products with which the sheets are impregnated are still uncured and thus capable of fusing during the molding operation.

It has been found that a remarkable improvement in decorated dinnerware can be obtained by the use of a surface lamination consisting of the impregnated paper sheet of the present invention. When the present impregnated paper sheet is used to form the surface lamination, the stain-resistance and luster retention of the resulting surface, instead of being inferior to that of the unlaminated lower side of the molded article, are actually superior to the stain-resistance and luster retention of the lower side of the molded article.

Consequently, the present invention makes possible the production of decorated dinnerware which is satisfactory for use in restaurants because it can be used indefinitely without appreciable staining and without appreciable loss of luster on the decorated or laminated surface.

An important requisite which is met by an impregnated paper sheet embodying the present invention is that it forms a surface lamination that cures in 1 to 2 minutes at 315° F. The ability of the present impregnated paper sheet to cure in 1 to 2 minutes at 315° F. is essential in order to made it possible to use the present impregnated paper sheet as the surface lamination on an article of molded dinnerware. That is true because the body of an article of molded dinnerware, other than the surface lamination, is formed from a standard formaldehyde-melamine molding composition which must be formed by molding for 1 to 2 minutes at 315° F.

In other words, the conditions of 1 to 2 minutes at 315° F., under which a surface lamination formed from a paper sheet of the present invention must be cured, are fixed because those are the curing conditions which must be used for standard commercial formaldehyde-melamine molding composition that forms the body of the article of molded dinnerware. Also, the molding temperature must be limited to 315° F., which is equal to 157° C., in order to avoid charring of the cellulose filler contained in the standard commercial molding composition or the cellulose contained in the paper surface lamination. Thus it would not be possible in the molding of an article of dinnerware to use the curing conditions of 3 to 5 minutes at 175° to 225° C. which were employed in Example 7 of U.S. Pat. No. 2,841,571 in order to complete the cure of a formaldehyde-melamine reaction product with which the heat-resistant fabric had been impregnated.

Thus the combination of an acidic salt of aluminum or zinc with a slightly hydrophobic, unmodified reaction product of formaldehyde and melamine in a molar ratio from 1:1 to 1.9:1 which is used in the practice of the present invention has three advantages in that it forms an aqueous solution which remains ungelled for at least 12 hours at ordinary temperatures, in that it remains substantially stable after paper sheets have been impregnated with the aqueous solution and dried, and in that the dried paper sheets form surface laminations that cure in 1 to 2 minutes at 315° F. to a surface having superior stain-resistance and luster retention.

DESCRIPTION OF THE PREFERRED EMBODIMENTS

The first advantage achieved in the practice of the present invention, which is the stability of the aqueous impregnating solution, has been demonstrated as follows.

EXAMPLE 1

A solution was prepared by adding 1 mole of melamine to an aqueous solution of 1.5 moles of formaldehyde and heating to about 200° F. to obtain a clear solution having a pH between 8 and 9. The solution was then refluxed at atmospheric pressure until cloudiness appeared upon the addition of 1 drop of the solution to a large volume of water at 100° F., indicating that a slightly hydrophobic reaction product had been obtained. After being rapidly cooled to room temperature the resulting solution remained clear for a period of 2 to 4 weeks. The concentration of the initial aqueous solution of formaldehyde employed was such that the final solution had a solids content of 53 percent. In calculating the solids content of the solution, it is assumed that 1 mole of water is split off during the reaction for every 3 moles of formaldehyde.

The reaction product in this solution, having a molar formaldehyde-melamine ratio of 1.5:1 is slow curing. However, incorporation of an ordinary acidic curing catalyst in this solution renders it too unstable for commercial use.

In order to demonstrate the effect of incorporating an ordinary acidic curing catalyst in the solution prepared as described above, lactic acid was added to the solution in an amount equal to 0.6 percent by weight of the solution. The resulting composition had a pH of 6.7, and began to gel in about 5 hours at ordinary temperatures after addition of the lactic acid, so that the solution containing the lactic acid could not be used in a commercial laminating operation, in which a tank of solution must remain stable and ungelled throughout a working day while successive sheets or a continuous strip of paper is being impregnated.

Aluminum nitrate, instead of lactic acid, was added to another sample of the initial solution in an amount equal to 0.3 percent of the weight of the sample solution. The resulting composition had a pH of 7.15, and a sheet of paper impregnated with the composition and dried, when used as a surface lamination, was found to cure in 1 to 2 minutes at 315° F., the rate of cure being at least as rapid as the rate of cure of a sheet impregnated with the unstable sample of solution containing lactic acid. The sample of solution containing the aluminum nitrate remained clear at 75° F. for more than 7 hours. At this temperature, a slight haze developed in about 10 hours, and the solution became cloudy in about 18 hours but was still usable in ordinary impregnating apparatus after about 20 hours.

EXAMPLE 2

Another composition was prepared from another part of the same initial solution by adding 0.6 percent by weight of zinc sulphate. The resulting solution could be used to produce surface laminations in the same manner as the solution containing aluminum nitrate, had a pH of 7.4, and had substantially the same stability at 75° F. as the solution containing aluminum nitrate.

PREPARATION OF AQUEOUS SOLUTION OF SLIGHTLY HYDROPHOBIC REACTION PRODUCT

An aqueous solution of a reaction product for use in the practice of the invention may be prepared by dissolving 1 mole of melamine in an aqueous solution containing from 1 to 1.9 moles of formaldehyde, the concentration of the initial aqueous solution of formaldehyde being such that the reaction with the melamine produces a solution containing from about 45 to about 60 percent solids, assuming that 1 mole of water is split off during the reaction for every 3 moles of formaldehyde. Before the melamine is added to the formaldehyde solution, a base such as sodium hydroxide or an acid such as formic acid is added to the formaldehyde solution if necessary, in order that a solution having a pH from 8 to 9 may be obtained by addition of the melamine and heating to about 200° F. The solution is then refluxed at atmospheric pressure until cloudiness appears upon the addition of 1 drop of the solution to a large volume of water at 100° F., indicating that a slightly hydrophobic reaction product has been obtained. Then the solution is cooled as rapidly as possible to room temperature.

As the molar ratio of formaldehyde to melamine used for the reaction approaches 1.9, the benefits obtained in the practice of the invention decrease somewhat. On the other hand, as the molar ratio approaches 1:1, it becomes more difficult to obtain a clear solution. The preferred molar ratio of formaldehyde to melamine for use in the practice of the invention is from about 1.2:1 to about 1.7:1. A solution prepared as hereinbefore described, using a molar ratio in this preferred range, will remain stable from 2 to 4 weeks if no curing catalyst has been added to the solution.

PRODUCTION OF IMPREGNATED PAPER SHEET

An impregnating solution for use in the practice of the invention is prepared by adding to a solution of a slightly hydrophobic reaction product, prepared as described above, a latent curing catalyst consisting of a water-soluble acidic salt of aluminum or zinc. The amount of the latent curing catalyst added to the solution varies with the particular catalyst employed, and may range from 0.05 to 2.0 percent of the weight of the solution. Usually the amount of the latent curing catalyst added is from 0.1 to 1.0 percent of the weight of the solution.

The substance added to the solution as a latent curing catalyst may be any acidic salt of aluminum or zinc, such as aluminum acetate, aluminum lactate, zinc acetate, or any other water-soluble acidic salt of aluminum or zinc with an organic acid. However, the preferred type of latent curing catalyst for use in the practice of the invention is a water-soluble salt of aluminum or zinc with a strong mineral acid, such as aluminum sulphate, aluminum chloride, aluminum nitrate, zinc sulphate, zinc chloride or zinc nitrate.

The concentration of the impregnating solution used in the practice of the invention may be any concentration which makes it possible to impart the desired amount of the melamine-formaldehyde reaction product to the paper by an impregnating operation. Ordinarily the concentration of the solution is from about 30 to about 70 percent solids.

The solution may be used to impregnate paper in the usual manner. A continuous web of paper may be fed from a supply roll, and may be impregnated by means of coating rolls, or by passing it beneath the surface of the solution. Preferably the paper is initially impregnated by means of rolls and then is passed through the solution.

Because of the light color and excellent durability attainable by the use of a melamine-formaldehyde reaction product, paper impregnated with such a reaction product is advantageously used as the surface sheet in the production of the laminated article. Also the paper used for impregnation with a melamine-formaldehyde reaction product usually is a white paper, such as an alpha cellulose paper, in order to take advantage of the exceptionally light color of the melamine-formaldehyde reaction product. The paper may consist of 100 percent alpha cellulose fiber, or it may consist of a mixture of alpha cellulose fiber and rayon fiber, the proportion of each fiber usually being between 40 and 60 percent.

The proportion of melamine-formaldehyde resin in the impregnated paper, measured on a dry basis, may range between 45 and 70 percent by weight, the remainder of the impregnated paper consisting of cellulose fiber. The dried paper comprises 30 to 55 parts by weight of cellulosic fibers impregnated with 45 to 70 parts by weight of the curable resin.

After the impregnating operation, the impregnated paper may be dried at a temperature from about 240° to about 280° F. for about 1 minute.

PRODUCTION OF LAMINATED ARTICLE

A laminate produced by the use of such impregnated paper as the top sheet is useful for applications such as doors, table tops and counter tops for which a permanent attractive appearance is desired. The present invention makes it possible to produce a surface of greatly improved stain resistance and luster retention.

A particularly important application of the present invention is in the production of an impregnated paper sheet which is to form the ornamental surface on decorated dinnerware.

An impregnated paper sheet embodying the invention also may be used to form the surface layer in the production of a laminate in which the body of the laminate consists of a fibrous material such as particle board composed of wood fiber.

EXAMPLE 3

Three solutions were prepared by reacting formaldehyde and melamine in three different molar ratios, according to the following procedure.

Melamine (1,261.3 parts by weight) was dissolved in an aqueous formaldehyde solution which had been prepared as indicated in Table 1 below. Before the addition of the melamine, sodium hydroxide had been added to the formaldehyde solution in an amount such that the pH of the clear solution obtained by adding the melamine and heating to 200° F. was between 7.9 and 8.5. The reaction solution was then refluxed until the addition of a drop of the solution to 100 cc. of water at 100° F. caused cloudiness to appear. The reaction solution was then cooled to room temperature. The total amount of water in each of the three reaction solutions thus prepared was equal to the total amount of melamine and formaldehyde used for the reaction. Table 1 below shows the number of parts by weight of 37 percent aqueous formaldehyde solution and the number of parts by weight of water used in preparing the initial formaldehyde solution in each case, and shows the number of moles of formaldehyde used for each mole of melamine.

TABLE 1

| Amount of 37% Formaldehyde Solution | Amount of Water | Mole Ratio of Formaldehyde to Melamine |
| --- | --- | --- |
| 1055 | 987 | 1.30 |
| 1218 | 945 | 1.50 |
| 1380 | 903 | 1.70 |

An impregnating solution was prepared by addition of a different latent curing catalyst to each of several samples of each solution of a melamine-formaldehyde reaction product prepared in the manner described above. A different sheet of alpha cellulose paper was impregnated with each of the resulting solutions in an amount such that the impregnated paper, after being dried, contained from 67 to 69 percent of melamine-formaldehyde resin. The excess of the solution remaining on the surface of the impregnated paper was removed by means of scraper bars and pressure rolls, and the impregnated paper was dried at 270° F., for about 1 minute. After the drying operation, samples of the impregnated paper were subjected to a standard test in which eight or nine sheets of the paper were pressed together at about 300° F. for about 2 minutes, and the flash durrounding each laminated piece was then broken off and weighed. The weight of the flash was between 6 and 12 percent of the total weight of each laminated piece including the flash.

Each dried impregnated sheet was then used as a surface lamination in the molding of a dinner plate. A commercial alpha cellulose filled melamine-formaldehyde molding composition was used to form the body of the plate. A preheated preform of the molding composition was first molded at a temperature of 315° F. and under a pressure of about 3,000 pounds per square inch for 45 seconds and the mold was then opened and the impregnated paper sheet was placed on top of the molded piece. The mold was then closed to hold the piece under the same pressure and temperature for the period of time specified in Table 2 below, and the finished piece was ejected from the mold.

As a control, the same procedure was used to produce a molded plate with a surface lamination consisting of an alpha cellulose paper containing about 67 percent by weight of a thermosetting product of the reaction of formaldehyde and melamine in a molar ratio between 2:1 and 2.5:1. The impregnated paper used for the control was an ordinary commercial impregnated paper of a standard grade which is used to form a surface lamination on molded dinnerware.

Each molded plate thus produced was sawed in half, and one-half of each plate was tested by immersing it in a test bath which had been prepared by adding instant coffee to water in an amount equal to 96 grams per gallon of water. The test bath containing the samples was held at a temperature of 180° F. for 48 hours, and the half plates were then removed from the bath, rinsed with water and dried. The results of the test were determined by measuring the degree of staining of the laminated surface of each test piece. The degree of staining of each test piece was determined by comparing the reflectance for blue light (475 $\mu$) of the laminated surface of the tested half of each plate with the reflectance of the laminated surface of the untested half of the plate, using a Bausch and Lomb spectrophotometer (Spectronic No. 20).

Table 2 below, showing the results of a number of tests, gives the number of moles of formaldehyde used for each mole of melamine in preparing the impregnating solution, the name of the catalyst, the amount of the catalyst in percent by weight of the reaction solution, the number of minutes for which the piece was cured at 315° F. after addition of the top sheet, and the stain-resistance expressed as the percent reflectance for blue light of the laminated surface of the test piece, taking the reflectance of the laminated surface of the untested half of the plate as 100 percent.

TABLE 2

Control (Commercial product of standard grade)

| $CH_2O$ Moles | Minutes Cure | Stain Resistance |
| --- | --- | --- |
| Between 2.0 and 2.5 | 2 | 52 |
| | 1 | 46 |

Aluminum Chloride

| $CH_2O$ Moles | % of Catalyst | Stain Resistance 1 min. cure | 2 min. cure |
| --- | --- | --- | --- |
| 1.3 | 0.3 | 84 | 91 |
| 1.5 | 0.3 | 82 | 90 |
| 1.5 | 0.6 | 91 | 91 |
| 1.7 | 0.3 | 75 | 82 |

Zinc Chloride

| $CH_2O$ Moles | % of Catalyst | Stain Resistance 1 min. cure | 2 min. cure |
| --- | --- | --- | --- |
| 1.3 | 0.3 | 77 | 87 |
| 1.3 | 0.6 | 80 | 90 |
| 1.5 | 0.3 | 84 | 90 |
| 1.5 | 0.6 | 90 | 93 |
| 1.7 | 0.3 | 88 | 92 |
| 1.7 | 0.6 | 88 | 93 |

Aluminum Nitrate

| $CH_2O$ Moles | % of Catalyst | Stain Resistance 1 min. cure | 2 min. cure |
| --- | --- | --- | --- |
| 1.3 | 0.3 | 78 | 92 |
| 1.5 | 0.3 | 84 | 85 |
| 1.7 | 0.3 | 74 | 84 |

Zinc Nitrate

| $CH_2O$ Moles | % of Catalyst | Stain Resistance 1 min. cure | 2 min. cure |
| --- | --- | --- | --- |

| 1.3 | 0.6 | 88 | 92 |
| 1.5 | 0.6 | 87 | 90 |
| 1.7 | 0.6 | 82 | 84 |

Aluminum Sulphate

| CH$_2$O Moles | % of Catalyst | Stain Resistance 1 min. cure | 2 min. cure |
| --- | --- | --- | --- |
| 1.3 | 0.6 | 56 | 67 |
| 1.5 | 0.6 | 71 | 73 |
| 1.7 | 0.6 | 62 | 71 |

Zinc Sulphate

| CH$_2$O Moles | % of Catalyst | Stain Resistance 1 min. cure | 2 min. cure |
| --- | --- | --- | --- |
| 1.3 | 0.6 | 83 | 88 |
| 1.5 | 0.6 | 70 | 78 |
| 1.7 | 0.6 | 58 | 68 |

Zinc Acetate

| CH$_2$O Moles | % of Catalyst | Stain Resistance 1 min. cure | 2 min. cure |
| --- | --- | --- | --- |
| 1.3 | 1.2 | 61 | 68 |
| 1.5 | 1.2 | 55 | 76 |
| 1.7 | 1.2 | 56 | 70 |

The results given in Table 2 show that the staining of the laminated surface of the control pieces was relatively severe. Visual observation of these control pieces showed that the laminated surface of each test piece was more severely stained than the unlaminated underside of the piece, even though the staining of the underside was quite substantial.

The results given in the table also show that in the practice of the present invention, the use of a relatively low molar formaldehyde-melamine ratio such as 1.3:1 gives superior stain-resistance, but results in a product that is relatively slow curing. In commercial practice, a cure time of 1 minute is quite satisfactory, but a cure time of 2 minutes is on the borderline of acceptability.

Visual observation of the pieces having a laminated surface produced in accordance with the present invention which were tested as described above showed that the staining and loss of luster on the laminated surface was barely appreciable, whereas the staining and loss of luster on the underside of each piece was relatively quite substantial.

Other molded plates produced as described above, instead of being subjected to immersion in a coffee solution, were washed repeatedly in a commercial dishwasher, using various chlorinated caustic detergents which are commonly used in commercial dishwashing. Under these conditions the laminated surfaces of the plates prepared in accordance with the present invention retained their gloss and luster far longer than the laminated surfaces of the control plates which had been produced by the use of a standard commercial impregnated paper. Loss of gloss and luster is an indication that the resistant melamine-formaldehyde resin surface has been leached away to expose the cellulose fibers. Once this has occurred the laminated surface is subject to very severe and rapid staining.

I claim:

1. A dried paper sheet which forms a surface lamination that cures in 1 to 2 minutes at 315° F. to a surface having superior stain-resistance and luster retention, which comprises 30 to 55 parts by weight of cellulosic fibers impregnated with a substantially stable composition consisting essentially of 45 to 70 parts by weight of a curable slightly hydrophobic, unmodified reaction product of formaldehyde and melamine in a molar ratio from 1:1 to 1.9:1 and, as a latent curing catalyst, a water-soluble acidic salt of a metal of the class consisting of aluminum and zinc.

2. A dried paper sheet according to claim 1 wherein the molar formaldehyde-melamine ratio of the reaction product is from 1.2:1 to 1.7:1, and the metal salt is a salt of a strong mineral acid.

* * * * *